United States Patent Office.

HAYWARD A. HARVEY, OF ORANGE, NEW JERSEY, ASSIGNOR TO THE HARVEY STEEL COMPANY, OF NEW JERSEY.

PROCESS OF TREATING LOW STEEL.

SPECIFICATION forming part of Letters Patent No. 376,194, dated January 10, 1888.

Application filed December 8, 1886. Serial No. 221,026. (Specimens.)

*To all whom it may concern:*

Be it known that I, HAYWARD A. HARVEY, of Orange, New Jersey, have invented a certain Improvement in the Treatment of Low Steel, of which the following is a specification.

This invention relates to a method of treatment by which the characteristic qualities of refined crucible-steel are imparted to steels of low grades—such as Bessemer steel, basic steel, &c.—whereby such steels are made capable of taking any prescribed temper, and are adapted to be manufactured into machinists' tools, axes, knives, fine cutlery, or cutting or abrading instruments of any kind, and by which such low steels are given increased tensile strength and are rendered weldable, so that they can be piled and reworked without difficulty.

The essential conditions of the method of treatment to which the ingot or other body of steel is subjected are the presence of carbon, the absence of oxygen, and high temperature—*i. e.*, a temperature above 1,500° Fahrenheit, the degree of temperature being varied according to the degree of hardness which the product is required to be capable of taking in the subsequent process of tempering. The higher the temperature is the higher is the temper which the product is rendered capable of taking.

In carrying out the treatment the ingots or other bodies of steel which are to be treated are embedded in a finely-powdered carbonaceous material, preferably hard-wood charcoal, contained in crucibles, boxes, or receptacles made of plumbago or some other refractory material, and provided with covers to prevent the charcoal from being consumed.

No special kind of furnace is required; but in practice a furnace of the regenerative type may be preferred, both for the sake of economy in fuel and because of the rapidity with which the heating operation can be performed.

The shape and dimensions of the furnace-chamber will of course be governed by the shapes and sizes of the ingots or other bodies of steel which are to be treated. For example, ingots, say, two inches by three and eighteen inches long may be treated in receptacles nine inches by ten inside, and, say, twenty-four inches long. Such a receptacle will serve to contain six ingots separated from each other and from the walls of the receptacle by thicknesses of one inch of powdered charcoal, and separated from the bottom of the receptacle by a layer of one inch of powdered charcoal, and from the cover by a layer of, say, three inches or more of powdered charcoal.

The fire chamber or heating-chamber may be proportioned with reference to containing any desired number of boxes or other receptacles for the charcoal. The boxes or other receptacles for the charcoal may be heated by direct contact with a body of incandescent fuel, in which they are embedded; or they may be deposited in a heating-chamber and be heated by contact with or radiation from the flames conducted through such heating-chamber. The time required for the heating operation will depend, of course, upon the dimensions of the body or bodies of steel under treatment, and also upon the efficiency of the furnace employed. The object to be accomplished is the uniform heating throughout of the body of material under treatment, which, for present convenience, may be called "raw steel."

If the raw steel is in a large mass or masses, the heating operation will have to be conducted more slowly in order that the interior of the mass of raw steel may be raised to the required temperature without melting the crucible or box in which the raw steel is packed. When the raw steel is embedded in powdered charcoal contained in a covered crucible, it may be raised above its ordinary melting-point without being melted, and certain excellent results are produced by raising the raw steel to upward of 3,000° Fahrenheit. When the desired temperature has been reached and the heating operation has been so conducted or prolonged as to have insured the uniform heating through of the material under treatment, the receptacle containing such material is at once allowed to cool off, and, if desired, may be removed from the furnace to hasten its cooling. By this treatment raw steel, which previously could not be welded or tempered, becomes weldable and undergoes a transformation by which its tensile strength is increased, and by which it acquires the characteristics of refined crucible steel, or so called "tool steel" of the higher grades.

There are a great variety of existing furnaces in which the process can be conducted. Such furnaces of course vary in their efficiency; but a few trials by an operator skilled in the management of any particular form of furnace will suffice to determine the time required for conducting the process in such furnace, and also for varying the process with reference to the qualities which it is desired the product shall possess. Thus, for example, if a product capable of taking a temper of a very high degree of hardness be required, the material under treatment will be raised to a temperature, say, of about 3,000° Fahrenheit. The product, which has been raised to about this temperature and allowed to cool off to a temperature of, say, 200° or 300° Fahrenheit before being removed from the powdered charcoal in which it has been embedded, will on removal be found very soft, will exhibit a clean surface of a dull gray or zinc color, and will be capable of taking a temper so high that tools made from it and hardened will cut chilled iron, and may be successfully used for turning chilled-iron rolls.

By so varying the process as to lower the extreme limit of temperature to which the material under treatment is raised the product when cooled off will exhibit a clean surface of a slightly-golden tint, and will be capable of taking a temper nearly as high as that which the gray-colored product is capable of taking. By further lowering the limit of temperature to which the material under treatment is raised the product when cooled will exhibit a surface of a pale-blue tint, and will be capable of taking a temper somewhat lower than that which the golden-tinted product is capable of taking. By still further lowering the limit of temperature to which the material under treatment is raised—say, for example, to a temperature of about 1,500° Fahrenheit—the product when cooled will exhibit a surface of dark-purple color, but will be capable of taking a low temper.

The tints referred to are similar to those which are exhibited upon the surface of a piece of ordinary tool steel after it has been heated and while its temper is being drawn. In the case of such a tool the color which it finally exhibits after the tempering operation has been completed indicates the degree of hardness which it then possesses, different colors indicating different degrees of hardness. If the tool is very hard, its surface may have a gray color; if it is slightly less hard, its surface may have a straw color or golden tint, and if still less hard its surface exhibits a blue tint, and if it possesses only a moderate degree of hardness its surface may have a dark-purple tint. In the case of such tool steel these colors are respectively the invariable accompaniments of various degrees of hardness. On the contrary, in the present process the several colors exhibited, respectively, by a number of objects which have been heated to different degrees of temperature and allowed to cool before being removed from their charcoal beds do not indicate like differences in hardness then possessed by those objects, the fact being that they are all of them comparatively soft. What their colors do indicate is the extreme limit of hardness to which they can be respectively brought in the operation of tempering them subsequently. Thus a product of pale-blue tint can in the process of tempering be brought to the condition of hardness which is ordinarily accompanied by the appearance of the blue tint upon the surface, but cannot be made any harder. Its temper, however, can be drawn down so that it will be that indicated by a dark-purple tint upon the surface. Similarly, a product of the present process exhibiting a golden tint, or straw color, can in tempering be hardened to straw color, but no higher, and its temper can be drawn down to a pale blue or to a dark purple. The same principle holds good as to the product having the gray tint, which, in tempering, may be given the extreme hardness indicated by the gray tint, and may have its temper drawn so that it will exhibit in succession all the ordinary variations in color down to the dark-purple tint. It will therefore be perceived that in practicing the process herein described the color exhibited by the product upon its being removed from the charcoal, after having been allowed to cool off therein, affords a reliable indication of the character of the product as to its capacity for tempering, so that it will not be necessary to actually test the product before hardening it to find what its qualities are.

In practice it will not be necessary that the products which have been treated shall remain in the charcoal bed until perfectly cool. They may be removed as soon as they are cool enough to be handled.

If removed while hot, their surfaces will of course be more or less oxidized by exposure to the air, and they will be slightly harder. Such oxidation will to some extent obscure their colors, but will do no material harm. The principal useful effects produced result from the high temperature to which the objects under treatment are subjected and do not depend upon the method of cooling. As the products of the treatment exhibit different colors according to the temperature employed, so different parts of the same ingot or bar may be made to exhibit different colors by subjecting such parts to different temperatures. For example, the ingots or bars under treatment may, if desired, be subjected to intense heat at one end and to a lower heat at the other end, so that they will exhibit when removed from the charcoal a gray color at the ends which have been most intensely heated and a blue or purple color at the other ends, and the regular series of intermediate colors between their gray and purple portions. All parts of them, however, will be found to have acquired the property of weldability, so that they can be readily piled and reworked. After a furnace has been tested by trial and the colors exhibited by the products under different conditions of treatment have been observed, the character of the results which will be produced by a prescribed duration of treatment in that furnace will be known; hence all that is required is to carefully reproduce in repetitions of the treatment the conditions as to heat and duration which have previously been noted as those which result in the yield of products having the required color—that is, products having the capacity to take in tempering the degree of hardness desired.

It is difficult, and in the case of ordinary furnaces impossible, to accurately measure such high temperatures, and in view of this fact, and also in consideration of the varying efficiency of different furnaces and of different fuels, the more practical method of conducting the process will be by regulating the duration of the heating operation, after having first ascertained by trial what length of time is taken in the particular furnace and with the particular fuel employed, whether solid or gaseous, to heat the material under treatment to such a temperature as will produce a product of the desired color.

The temperatures herein mentioned are to be regarded simply as approximations to the actual temperatures employed in practice. It is not necessary that these temperatures, which cannot easily be measured, shall be herein accurately prescribed, because the observation of the periods of time occupied in the particular furnace and the observation of the colors which the treated ingots respectively exhibit, with the particular fuel which may be employed, affords all the information required for the subsequent successful production of ingots having like colors by the use of similar fuel in the same furnace.

A single ingot, say, two by three inches and eighteen inches long, deposited in powdered charcoal in a crucible, say, five inches in diameter and twenty-four inches long, can be successfully treated by keeping such crucible embedded in a free-burning coke fire for a period of from four to six hours. A larger ingot or a number of ingots contained in a larger crucible may require a longer time—as, say, fifteen or twenty hours—to insure uniform heating throughout to the required temperature.

The product produced by this mode of treatment will be found to be free from scale and without blisters upon its surface. As there is no oxidation upon its surface, finished articles—such as knives, cutlery, files, and other cutting or abrading instruments made of low steel—may be subjected to the treatment without injury, and the material of which they are composed be thereby transformed into steel of fine quality.

It is to be remembered that the smaller the area in cross section of the articles under treatment the less will be the time required for their treatment under the high temperature herein prescribed, and the duration of the treatment will therefore be varied as found to be necessary in view of the sizes of the articles to be treated, as well as in view of the efficiency of the furnace and of the fuel which may be employed.

It has long been known that iron could be transformed into steel by depositing it in a bed of carbonaceous material and subjecting it to a high temperature for several days. The bars of steel so produced have their surfaces covered with blisters, and the product is hence known as "blister steel." It is also well-known that such steel is not adapted for making tools for working wood or metal.

A costly product, known as "Mushet steel," has also been made by fusing malleable iron with carbonaceous matters in crucibles. The Mushet steel is of extraordinary hardness, and has hence been employed for turning chilled-iron rolls and other analogous purposes.

It will be found not only that tools made from the gray-colored product produced by the process herein described will do perfectly well all the kinds of work which tools made from Mushet steel are capable of doing, but that they are superior to tools made from any other steel whatever for certain purposes —such, for example, as boring deep holes in chilled iron or steel or turning or planing the surfaces of thin-shelled chilled iron or steel castings, which, by reason of their shape, cannot be supported directly opposite the tool, and are hence liable to spring when the point of the tool is pressed hard against them.

What is claimed as the invention is—

1. The herein-described process of treating ingots or other objects composed of low steel—such as Bessemer steel—for the purpose of imparting to the metal of which such objects are composed the qualities of refined crucible steel, which consists, essentially, in embedding the object or objects to be treated in a body of granulated or powdered carbonaceous substance, such as wood-charcoal, deposited in a crucible or receptacle made of plumbago or any other suitable refractory material and provided with a cover to prevent the combustion of the charcoal, and in heating such receptacle and its contents in a furnace or heating-chamber the temperature of which is above the melting-point of cast-iron for such length of time that the objects treated when removed from the charcoal will exhibit clean unblistered surfaces of a prescribed color or colors, as herein set forth, and will possess the capacity of taking in tempering the degree or degrees of hardness ordinarily indicated by such color or colors.

2. The herein-described process of treating ingots or other objects composed of low steel—such as Bessemer steel—for the purpose of increasing the tensile strength of the metal of which such objects are composed and giving it the quality of weldability, so that it can be piled and reworked in the ordinary manner, which consists, essentially, in embedding the object or objects to be treated in a body of granulated or powdered carbonaceous substance, such as wood-charcoal, deposited in a crucible or receptacle made of plumbago or other suitable refractory material and provided with a cover to prevent the combustion of the charcoal, and in then heating such receptacle and its contents in a furnace or heating-chamber the temperature of which is above the melting-point of cast-iron for such length of time that the objects treated will on removal from the charcoal exhibit clean unblistered surfaces of a prescribed color or colors, as herein set forth.

H. A. HARVEY.

Witnesses:
R. C. HOWES,
M. L. ADAMS.